United States Patent

Kondo et al.

[11] Patent Number: 6,154,267
[45] Date of Patent: *Nov. 28, 2000

[54] METHOD OF FABRICATING A LIQUID CRYSTAL DISPLAY DEVICE INCLUDING A LIQUID CRYSTAL REGION SURROUNDED BY A POLYMER MATERIAL

[75] Inventors: Masahiko Kondo, Kitakatsuragi-gun; Yasuhiro Kume, Nara; Makoto Shiomi, Tenri; Wataru Horie, Hashimoto; Nobuaki Yamada, Higashiosaka, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/833,006

[22] Filed: Apr. 4, 1997

[30] Foreign Application Priority Data

Apr. 5, 1996 [JP] Japan ..................................... 8-084277
Aug. 12, 1996 [JP] Japan ..................................... 8212920

[51] Int. Cl.$^7$ .................................................. G02F 1/1339
[52] U.S. Cl. .............................................. 349/156; 349/92
[58] Field of Search ................................. 349/86, 156, 92

[56] References Cited

U.S. PATENT DOCUMENTS

| | | |
|---|---|---|
| 3,861,783 | 1/1975 | Dill et al. . |
| 3,863,332 | 2/1975 | Leupp et al. . |
| 3,978,580 | 9/1976 | Leupp et al. . |
| 4,673,255 | 6/1987 | West et al. ................................. 349/92 |
| 5,268,782 | 12/1993 | Wenz et al. . |
| 5,499,128 | 3/1996 | Hasegawa et al. . |
| 5,583,673 | 12/1996 | Onishi et al. ............................. 349/89 |
| 5,583,675 | 12/1996 | Yamada et al. ........................... 349/84 |
| 5,668,651 | 9/1997 | Yamada et al. ......................... 349/156 |
| 5,673,092 | 9/1997 | Horie et al. .............................. 349/86 |
| 5,729,318 | 3/1998 | Yamada et al. . |
| 5,739,889 | 4/1998 | Yamada et al. . |
| 5,784,137 | 6/1998 | Shiomi et al. .......................... 349/156 |

*Primary Examiner*—James A. Dudek
*Attorney, Agent, or Firm*—Nixon & Vanderhye P.C.

[57] ABSTRACT

A method of the present invention for manufacturing a liquid crystal display device including a liquid crystal region surrounded by a polymer material, includes the steps of: attaching a pair of substrates to each other, each having at least an electrode film; disposing a precursor mixture containing a liquid crystal material, a polymerizable resin material and a polymerization initiator, between the pair of substrate; precipitating a liquid crystal droplet by varying a temperature of the precursor mixture; growing the precipitated liquid crystal droplet; curing the polymerizable resin material at a temperature allowing the liquid crystal droplet to be 80% or more of a pixel in size and to be independently present within a pixel region; and applying an external field across the substrates to pre-tilt the molecules of the liquid crystal droplet.

23 Claims, 12 Drawing Sheets

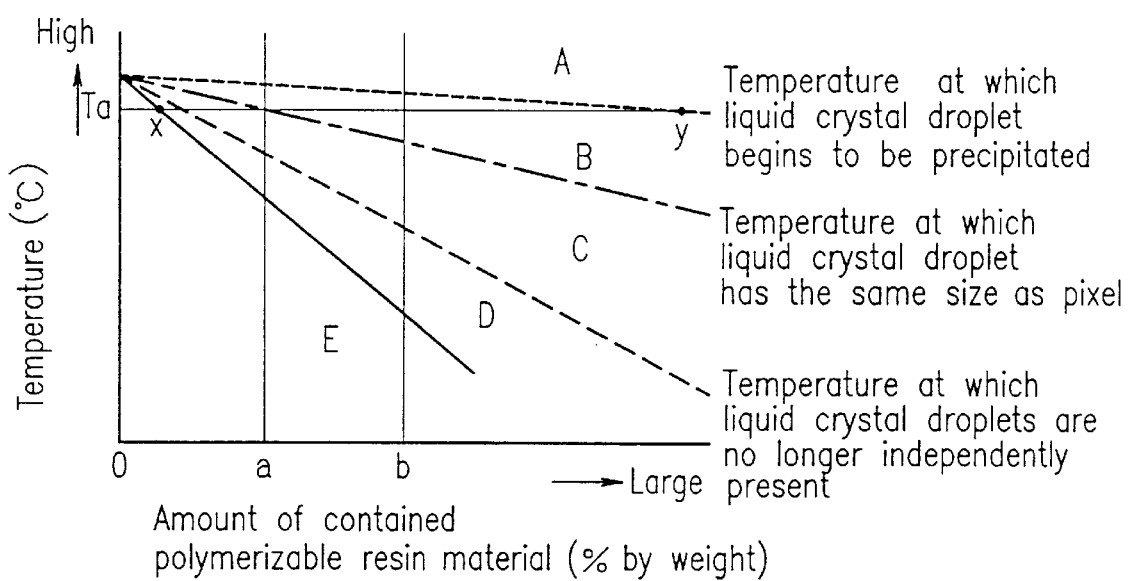

FIG.4A  3%  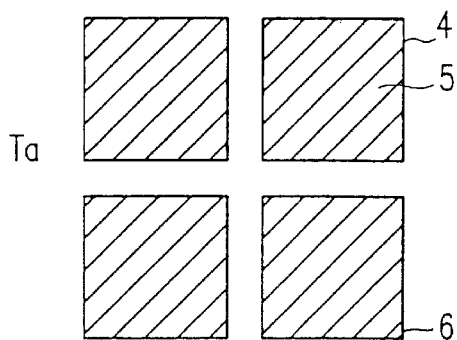
FIG.4E  7%  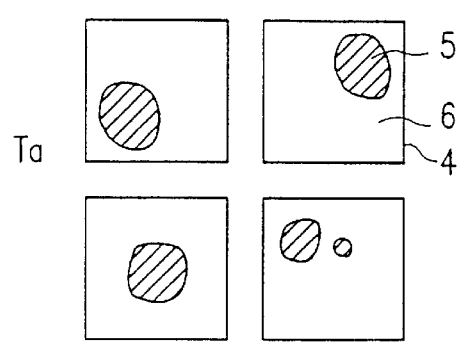
FIG.4B  3%  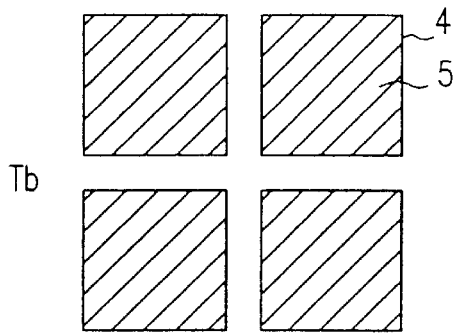
FIG.4F  7%  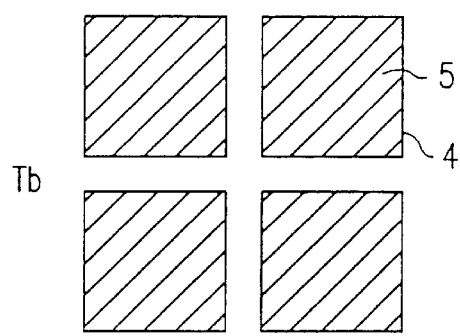
FIG.4C  3%  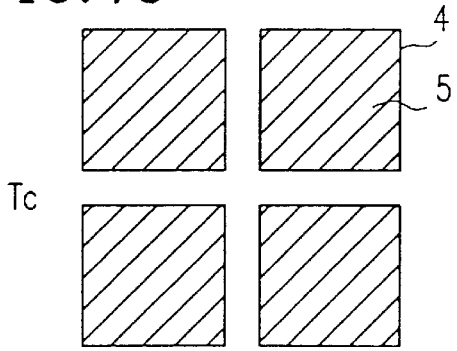
FIG.4G  7%  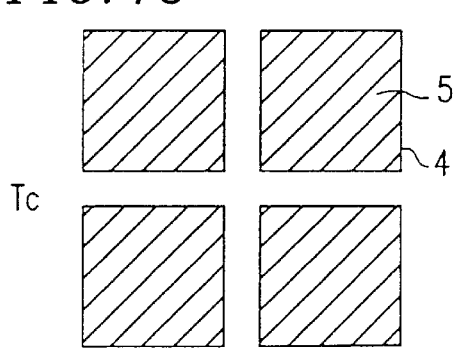
FIG.4D  3%  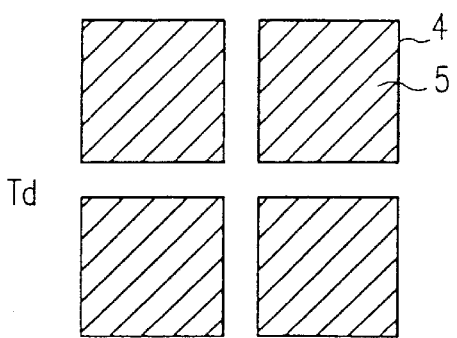
FIG.4H  7%  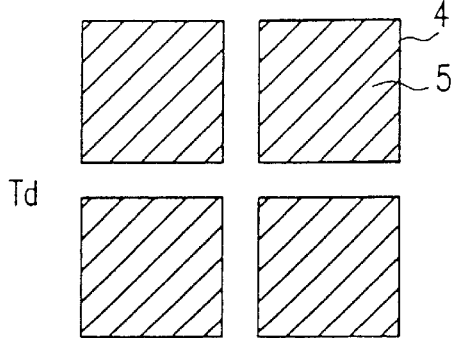

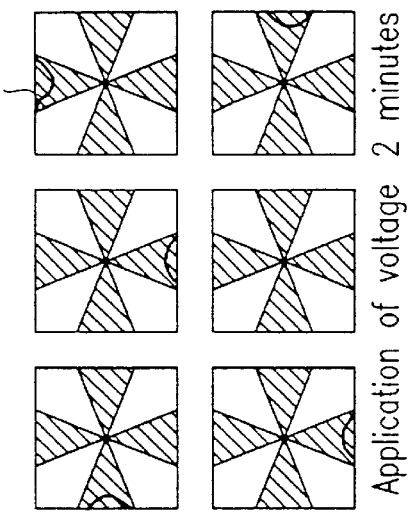
FIG.10A Application of voltage 0 minute
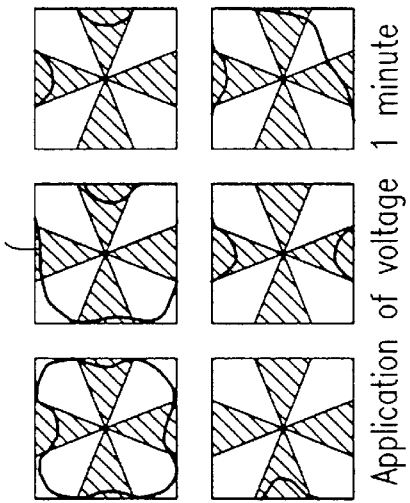
FIG.10B Application of voltage 1 minute
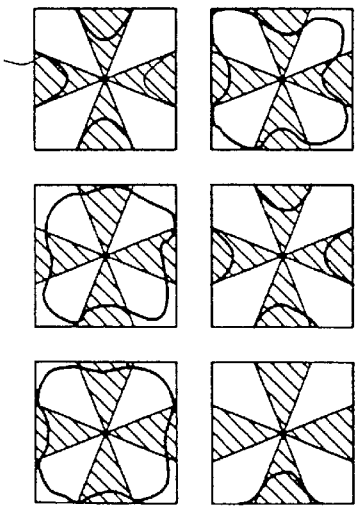
FIG.10C Application of voltage 2 minutes
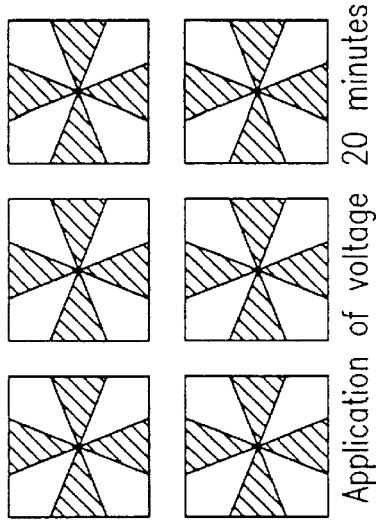
FIG.10D Application of voltage 5 minutes
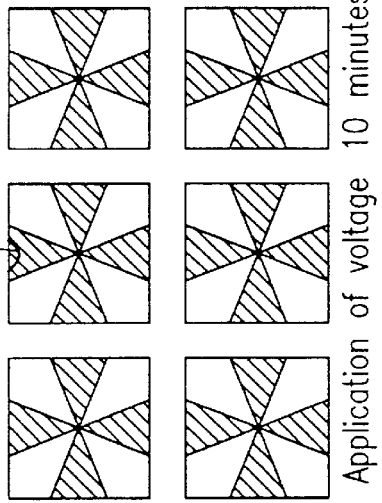
FIG.10E Application of voltage 10 minutes
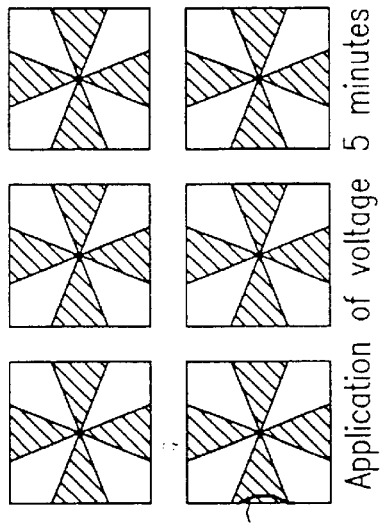
FIG.10F Application of voltage 20 minutes

METHOD OF FABRICATING A LIQUID CRYSTAL DISPLAY DEVICE INCLUDING A LIQUID CRYSTAL REGION SURROUNDED BY A POLYMER MATERIAL

BACKGROUND OF THE INVENTION

1. Field of the Invention

The present invention relates to a method for manufacturing a liquid crystal display device applicable to: a portable data terminal to be viewed by a plurality of persons; a flat panel display such as a personal computer, a word processor, amusement equipment and television; and a display board, a window, a door or a wall, taking advantage of a shutter effect.

2. Description of the Related Art

Japanese Laid-Open Patent Publication Nos. 6-301015 and 7-120728 disclose a liquid crystal display device including a liquid crystal region surrounded by a polymer region, with excellent mechanical strength and viewing angle characteristics, and a method for manufacturing such a liquid crystal display device.

FIG. 12 is a schematic partial cross-sectional view of a liquid crystal display device 100 disclosed in Japanese Laid-Open Patent Publication No. 6-301015. In the liquid crystal display device 100, a liquid crystal layer 27 sandwiched between a pair of substrates 21 and 23 includes a polymer region 28 and a liquid crystal region 29 substantially surrounded by the polymer region 28. The liquid crystal region 29 is formed so as to correspond to a pixel defined by electrodes 22 and 24 facing each other. Liquid crystal molecules (not shown) in the liquid crystal region 29 are axisymmetrically aligned about a central axis (perpendicular to the substrates) of the liquid crystal region 29 in a radial manner or a concentric (tangential) manner. As a result, the liquid crystal display device 100 has wide viewing angle characteristics.

The liquid crystal display device described above is fabricated as follows. A precursor mixture containing a liquid crystal material, a polymerizable resin, and a polymerization initiator is interposed between a pair of substrates. Then, the precursor mixture is irradiated with light while regulating an irradiation intensity through a photomask, or the like, so as to cure the polymerizable resin material. As a result, a liquid crystal region is formed that is substantially surrounded by a polymer region formed of a polymer material obtained from the polymerizable resin material. The resultant liquid crystal display device has excellent mechanical strength and viewing characteristics because the polymer material serves to keep a distance between the pair of substrates along with the spacer and the sealing agent and because liquid crystal molecules in the liquid crystal region surrounded by the polymer material are not unidirectionally but multidirectionally orientated.

However, the conventional liquid crystal display device described above is disadvantageous in that $T_{NI}$ (phase transition temperature between Nematic phase and Isotropic phase) of a liquid crystal material within the liquid crystal region is lowered, a transmittance is lowered, a threshold voltage is increased, a response speed is low (i.e., response time is long) or the like. Furthermore, a disclination line appears in the peripheral region within the liquid crystal region.

SUMMARY OF THE INVENTION

The method of the present invention for manufacturing a liquid crystal display device including a liquid crystal region surrounded by a polymer material, includes the steps of: attaching a pair of substrates to each other, each having at least an electrode film; disposing a precursor mixture containing a liquid crystal material, a polymerizable resin material and a polymerization initiator, between the pair of substrates; precipitating a liquid crystal droplet by varying a temperature of the precursor mixture; growing the precipitated liquid crystal droplet; and curing the polymerizable resin material at a temperature allowing the liquid crystal droplet to be 80% or more of a pixel in size and to be independently present within a pixel region.

In one embodiment of the invention, the temperature for curing the polymerizable resin material allows the liquid crystal droplet to have the same size as the pixel and to be independently present within the pixel region.

In another embodiment of the invention, the temperature is varied by heating the precursor mixture to a temperature allowing the precursor mixture to be a uniform liquid and then cooling the precursor mixture.

In still another embodiment of the invention, the liquid crystal droplet is grown by lowering a temperature at a rate of 5° C./min or lower.

In still another embodiment of the invention, the method further includes the step of applying an external field across the pair of substrates so that a disclination line is present along an outer periphery of the liquid crystal droplet, thereby axisymmetrically orientating the liquid crystal molecules.

In still another embodiment of the invention, the step of applying the external field includes the step of boosting and dropping a voltage applied across the pair of substrates so that a disclination line is present along an outer periphery of the liquid crystal droplet, thereby axisymmetrically orientating the liquid crystal molecules.

In still another embodiment of the invention, the applied voltage is dropped at a rate lower than 2 V/min.

In still another embodiment of the invention, the liquid crystal molecules are axisymmetrically orientated at a temperature at which the size of the liquid crystal droplet becomes between 3% and 99% of the pixel.

In still another embodiment of the invention, a protruding structure is present so as to surround the pixel region of the substrate.

In still another embodiment of the invention, a voltage is applied across the pair of substrates so as to cure the polymerizable resin material.

Thus, the invention described herein makes possible the advantage of providing a method for manufacturing a liquid crystal display device having characteristics extremely close to those of liquid crystal itself.

This and other advantages of the present invention will become apparent to those skilled in the art upon reading and understanding the following detailed description with reference to the accompanying figures.

BRIEF DESCRIPTION OF THE DRAWINGS

FIG. 1 is a phase diagram of a precursor mixture containing a liquid crystal material and a polymerizable resin material.

FIGS. 4A to 4H schematically show a status of pixels in a liquid crystal display device manufactured in Example 1 by curing a polymerizable resin material at temperature Ta, Tb, Tc and Td° C. shown in FIG. 3: FIGS. 4A to 4D show the case where a polymerizable resin material is present at 3% by weight of the total amount; and FIGS. 4E to 4H show the case where a polymerizable resin material is present at 7% by weight of the total amount.

FIGS. 10A to 10F are schematic plan views showing the relationship between the occurrence of a disclination line in a pixel and the application time of a voltage during exposure to light in Example 9.

DESCRIPTION OF THE PREFERRED EMBODIMENTS

Hereinafter, the present invention will be described in detail.

Figure 12:
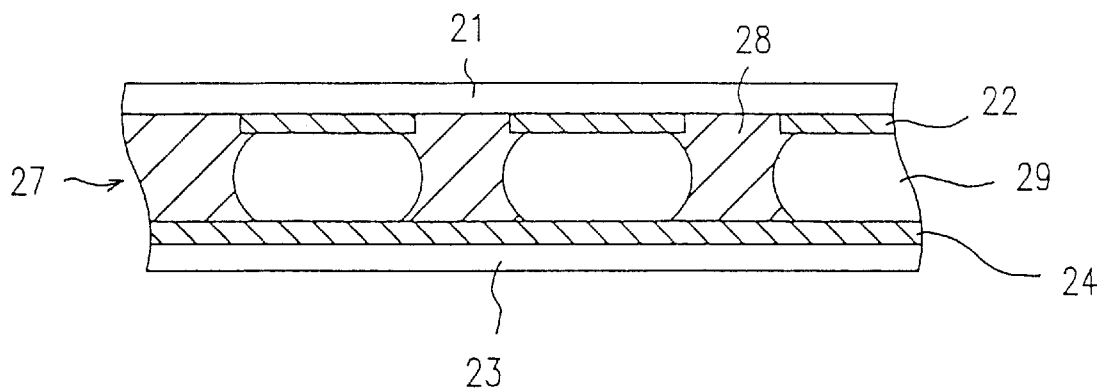
FIG. 12 is a partial cross-sectional view of a liquid crystal display device having a liquid crystal region including axisymmetrically orientated liquid crystal molecules.

A liquid crystal display device according to the present invention has substantially the same structure as that of the liquid crystal display device 100 shown in FIG. 12 except that a liquid crystal material within a liquid crystal region 29 has a high purity. Furthermore, according to the present invention, since a liquid crystal material within the liquid crystal region has characteristics extremely close to those of the liquid crystal itself, the liquid crystal display device of the present invention has excellent display characteristics.

It is not necessary that the liquid crystal region 29 is always formed for each pixel. Depending on the manufacturing method (for example, in the case where a pixel has a different vertical to horizontal ratio, i.e., a pixel has a rectangular shape), a pixel defined by a black matrix or the like, may be divided into n regions (n≧2). Then, a liquid crystal region may be formed for each region obtained by the division. The term "pixel" herein indicates a basic unit serving to display an image in the liquid crystal display device. The term "pixel region" indicates a portion constituting a pixel of the display device in the liquid crystal display device. The pixel region includes the liquid crystal region sandwiched between a pair of substrates. As described above, the pixel region may include a plurality of liquid crystal regions. The liquid crystal regions of the liquid crystal display device according to the present invention are arranged in a regular pattern so as to have a certain correspondence with pixels.

According to a preferred embodiment of a method of the present invention for fabricating a liquid crystal display device including a liquid crystal region surrounded by a polymer region made of a polymer material, a pair of substrates, each having at least an electrode film, are disposed so as to form a gap therebetween by dispersing spacers on one of the substrates, thereby constituting a cell. Next, a precursor material containing a liquid crystal material, polymerizable resin material and a polymerization initiator is injected into the gap between the pair of substrates. Then, by varying the temperature of the precursor material, phase-separation is caused so as to separate the precursor mixture into a liquid crystal phase and a miscible phase (i.e., a polymer phase which becomes a polymer region after curing the polymerizable resin material). The liquid crystal phase appears as a plurality of liquid crystal droplets (independent phases) in the miscible phase (liquid crystal droplet generation process). In the case where nematic liquid crystal is used as a liquid crystal material, the liquid crystal phase appears as liquid crystal droplets in a nematic phase. Thereafter, by further lowering the temperature of the precursor mixture, the phase-separation proceeds to grow the liquid crystal droplets (liquid crystal droplet growth process). The liquid crystal droplets grow while the plurality of the liquid crystal droplets fuse together. The term "growth of a liquid crystal droplet" herein indicates the increase in the size of the liquid crystal droplet. The term "size of the liquid crystal droplets" indicates an area of the liquid crystal droplet when viewed from a direction perpendicular to the substrate.

The polymerizable resin material is cured at a temperature allowing the liquid crystal droplet to have 80% or more of the size of a pixel and to be independently present within a pixel region, thereby obtaining a polymer material. The resultant liquid crystal display device includes a liquid crystal region substantially surrounded by the thus formed polymer region made of a polymer material.

The following are three examples of methods to regulate the size of the liquid crystal droplet to be 80% or more of the pixel: i) a method for regulating the size of a liquid crystal droplet by simply heating a precursor mixture containing a liquid crystal material, polymerizable resin material, and a polymerization initiator; ii) a method for heating the precursor mixture to be in a completely miscible state (uniform liquid state), cooling the precursor mixture to precipitate a liquid crystal droplet and then growing the thus formed liquid crystal droplet to regulate the size of the liquid crystal droplet; and iii) a method for regulating the size of a liquid crystal droplet by repetitive cycles of heating and cooling.

In the step of growing a precipitated liquid crystal droplet by lowering a temperature, the temperature is lowered at a rate slower than 5° C./min, preferably at a rate equal to or slower than 2° C./min, more preferably at a rate equal to or slower than 1° C./min. If the temperature is dropped at a faster rate, the liquid crystal droplet is precipitated in a nonuniform size. As a result, the size of a liquid crystal droplet may vary for each pixel. Furthermore, since liquid crystal droplets frequently fuse together, a disclination line may be likely to appear.

Next, a liquid crystal region surrounded by a polymer region made of the polymer material obtained by curing the polymerizable resin material is formed. The temperature for curing the polymerizable resin material may be determined as follows.

A status of the precursor mixture containing a liquid crystal material and a polymerizable resin material interposed between a pair of substrates of a liquid crystal cell is observed at various temperatures. The following temperatures are observed with respect to the amount of a polymerizable resin material (for the total amount of the precursor mixture containing the polymerizable resin material and the liquid crystal material in % by weight): a temperature at which a liquid crystal phase begins to be precipitated as a liquid crystal droplet; a temperature at which the liquid crystal droplet has the same size as a pixel; a temperature at which the liquid crystal droplets are no longer independently present (i.e., a temperature at which the liquid crystal droplets begin to fuse together); and a temperature at which all the precursor mixture becomes a liquid crystal phase (i.e., a temperature at which all the precursor mixture is in a liquid crystal phase, that is, a nematic phase). If these temperatures are plotted, a phase diagram shown in FIG. 1 is obtained.

In the phase diagram shown in FIG. 1, region A represents a region in which a liquid crystal material and a polymerizable resin material are completely miscible (in a uniform liquid). A straight boundary line between region A and region B represents a temperature at which a liquid crystal droplet begins to be precipitated with the respective amounts of the contained polymerizable resin material. The precipitated liquid crystal droplet grows in region B as a temperature is lowered. The size of the liquid crystal droplet in region B is smaller than that of a pixel. A straight boundary line between region B and region C represents a temperature at which the size of the liquid crystal droplet becomes the same as that of the pixel with the respective amounts of the polymerizable resin material. The liquid crystal droplets now having the same size as the pixel further grow as temperature is lowered in region C. A straight boundary line between region C and region D represents a temperature at which the liquid crystal droplets are no longer independently present at the respective amounts of the polymerizable resin material. In region D, since the liquid crystal droplet is fused with the adjacent liquid crystal droplet, the liquid crystal droplet further grows and become random in size. A straight boundary line between region D and region E represents a temperature at which all the regions become a liquid crystal phase with the respective amounts of the polymerizable resin material. In region E, the whole region is in a liquid crystal phase.

For example, a temperature of the precursor mixture containing a polymerizable resin material at a% by weight is lowered, the liquid crystal droplet precipitates from the mixture containing the liquid crystal material and the polymerizable resin material in a completely miscible state. When a temperature is dropped to $T_a$, the liquid crystal droplet has the same size as that of the pixel. The liquid crystal droplet at this point contains the amount of a polymerizable resin material indicated by x, and the mixture containing the liquid crystal material and the polymerizable resin material in a completely miscible state contains the amount of a polymerizable resin material indicated by y.

As is apparent from FIG. 1, when a temperature of the precursor mixture containing a polymerizable resin material at a % by weight is further lowered, the liquid crystal droplet grows as the amount of a polymerizable resin material contained in the liquid crystal droplet increases. Thus, a higher purity of the liquid crystal droplet can be obtained with a smaller liquid crystal droplet. However, if a liquid crystal droplet is small, the liquid crystal region substantially surrounded by a polymer region made of a polymer material obtained by curing the polymerizable resin material is small. As a result, an aperture ratio is reduced. Thus, the resultant display device has lowered performance. Therefore, in view of the size of the liquid crystal region to be formed (aperture ratio) and the purity of the liquid crystal material in the liquid crystal region, it is preferred that the polymerizable resin material is cured at a temperature allowing the liquid crystal droplet to have the size of 80% or more, preferably 100%, of that of the pixel regardless of the amount of the polymerizable resin material contained in the precursor mixture and to be independently present in one pixel region.

A temperature at which the liquid crystal droplet satisfies the above conditions differs depending on the employed liquid crystal material, the kind of a polymerizable resin material, a mixture ratio thereof, the shape of the substrate, the surface state of the substrate and the like. Therefore, the temperature at which the liquid crystal droplet satisfies the above conditions can be obtained by drawing a phase diagram for each combination of an employed liquid crystal material, a polymerizable resin material, and a substrate material.

The amount of the employed polymerizable resin material can be determined as follows.

As shown in FIG. 1, even in the case where the same polymerizable resin material and the same liquid crystal material are used, a temperature allowing the liquid crystal droplet to have the same size as that of the pixel region differs in the case where the amount of the contained polymerizable resin material (for the total amount of the precursor mixture containing the polymerizable resin material and the liquid crystal material in % by weight) is a % by weight and in the case where the amount of the contained polymerizable resin material is b % by weight (a<b). In the case where the amount of the contained polymerizable resin material is a% by weight, since the amount of a polymerizable resin material contained in the liquid crystal droplet (liquid crystal phase) and the miscible phase region is small, a transmittance of the liquid crystal display device, a threshold voltage, a response speed and the reliability are improved as compared with the case where the amount of the contained polymerizable resin material is b% by weight. However, since an absolute amount of a polymer material obtained by curing the polymerizable resin material is small, the stability against external pressure is reduced as compared with the case where the amount of the contained polymerizable resin material is b% by weight. Furthermore, since region B and region C are reduced thereby, a temperature should be strictly controlled so as to cure a polymerizable resin material in an appropriate state. Therefore, the amount of the polymerizable resin material used can be determined in view of performance required for the liquid crystal display device to be manufactured and the manufacturing conditions based on the phase diagram as shown in FIG. 1.

The polymerizable resin material can be cured mainly by light irradiation thereon. Since an intensity of exposure light and an exposure time vary depending on the ratio of the liquid crystal material to the polymerizable resin material, they are not particularly limited. In order to form a liquid crystal cell having an excellent mechanical strength, it is preferred to perform weak light irradiation for a long period of time rather than strong light irradiation for a short period of time. If the strong light irradiation is performed for a short period of time, a large amount of a polymer material having a low molecular weight is generated. If the polymer material has a small molecular weight, the liquid crystal cell having a sufficient mechanical strength cannot be obtained. In the case where the photomask is employed, the photomask has a continuous or independent regular pattern which may be arranged in a matrix or have a striped pattern. By irradiating the entire surface of the liquid crystal layer with light again after the liquid crystal region is formed, the polymerizable resin material can be perfectly cured.

According to a method for fabricating a liquid crystal display device of the present invention, viewing angle characteristics of a liquid crystal display device can be improved by axisymmetrically orientating liquid crystal molecules in a liquid crystal region. In order to axisymmetrically orientate the liquid crystal molecules, for example, a voltage is applied across the substrates constituting the cell prior to curing the polymerizable resin material. By boosting and dropping the applied voltage so that a disclination line occurs along the outer periphery of the liquid crystal droplet, the liquid crystal molecules can be axisymmetrically orientated. The applied voltage may be boosted and/or dropped a plurality of times. An applied voltage and a rate for boosting and/or dropping the applied voltage are suitably selected depending on the kinds of a liquid crystal material and a polymerizable resin material, the amount of a polymerizable resin material contained in a precursor mixture, a distance between the pair of substrates, and the size of a pixel. Instead of the application of a voltage, other external field (e.g., magnetic field) can be applied to obtain the axisymmetrical orientation of liquid crystal molecules.

The applied voltage is boosted or dropped at a temperature allowing the size of a liquid crystal droplet to be between 3% to 99% of a pixel, preferably between 10% and 90%, and more preferably between 30% and 75% of a pixel. In the case where the liquid crystal droplet is smaller than 3% of the pixel in size, the axisymmetrical orientation of the liquid crystal molecules may be disturbed in the process of growing the liquid crystal droplet. On the other hand, in the case where the liquid crystal droplet exceeds 99% of the pixel in size, it is difficult to regulate the position of a disclination line.

The disclination line can be reduced by providing a pretilt angle for liquid crystal molecules in the step of curing a polymerizable resin material so as to form a liquid crystal region. In order to provide a pretilt angle for liquid crystal molecules, a voltage is applied across the substrates simultaneously with curing of the polymerizable resin material. The application of a voltage is started at the initiation of the step of curing the polymerizable resin material, and is continued until a pretilt angle is provided for liquid crystal molecules. If a voltage is applied throughout the curing step, the liquid crystal molecules in a resultant display device have poor response characteristics to the application of a voltage, resulting in reduced contrast of display. Instead of the application of a voltage, other external field (e.g., magnetic field) can be applied to provide a pretilt angle for a liquid crystal molecule.

By forming a liquid crystal region at a position correctly corresponding to the position of a pixel, viewing angle characteristics of the liquid crystal display device can be improved. In order to form a liquid crystal region at a position correctly corresponding to the position of a pixel, it is necessary to regulate the position where a liquid crystal droplet is precipitated. In order to precipitate a liquid crystal droplet at the position corresponding to a pixel, for example, a substrate including a protruding structure surrounding a region, in which a liquid crystal region is formed so as to correspond to a pixel on the substrate, can be used.

As a liquid crystal material applicable to the present invention, any liquid crystal material can be used as long as it exhibits a liquid crystal state in the vicinity of an ordinary temperature. For example, the liquid crystal material includes: nematic liquid crystal (including liquid crystal for a dual frequency driving and liquid crystal with the anisotropy of dielectric constant $\Delta\epsilon<0$), cholesteric liquid crystal (in particular, liquid crystal having a selective reflection characteristic with respect to visible light), smectic liquid crystal, ferroelectric liquid crystal, and discotic liquid crystal. In particular, nematic liquid crystal, cholesteric liquid crystal, or nematic liquid crystal to which a chiral agent is added is preferred. In the nematic liquid crystal to which a chiral agent is added, in view of the hysteresis, uniformity, and coloring due to d·$\Delta$n (phase difference), it is preferred to add a chiral agent so as to provide a helical pitch of 10 $\mu$m or more. Moreover, since a photopolymerization reaction is caused during the manufacturing process, it is preferred to use a liquid crystal material having excellent resistance to a chemical reaction. More specifically, a liquid crystal material has a functional group such as fluorine atom in its compound, e.g., ZLI-4801-000, ZLI-4801-001, and ZLI-4792 (commercially available from Merck & Co., Inc.). These materials can be mixed.

The polymerizable resin material includes, for example, acrylic acids and acrylic esters having a long-chain alkyl group having 3 or more carbons or an aromatic group. Moreover, examples of the acrylic acids and acrylic esters include: isobutyl acrylate, stearyl acrylate, lauryl acrylate, isoamyl acrylate, n-butylacrylate, tridecyl acrylate, 2-ethylhexyl acrylate, cyclohexyl acrylate, benzyl acrylate, and 2-phenoxyethyl acrylate; and methacrylates obtained by substituting the above acrylates with methacrylates; a polymerizable material obtained by halogenating (in particular, chlorinating or fluorinating) the above-mentioned monomers, for example, 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate. These monomers can be used alone or in combinations of two or more kinds thereof.

The precursor mixture containing a polymerizable resin material and a liquid crystal material applicable to the present invention can contain a photopolymerization initiator if needed. Examples of the photopolymerization initiator include Irgacure 651, Irgacure 184 (manufactured by CIBA-GEIGY Corporation) and Darocur 1173 (manufactured by Merck & Co., Inc.). The photopolymerization initiator can be added at 0.01 to 3% by weight for the total amount of the precursor mixture containing the liquid crystal material and the polymerizable resin material.

The substrate may have an alignment layer for regulating the alignment of the liquid crystal molecules as needed. An alignment regulation method includes: a rubbing method for applying a polymer material such as polyimide or an inorganic material onto the substrate and then rubbing the substrate with a cloth; a vertical alignment method for applying a compound having a low surface free energy onto the substrate; an oblique alignment method utilizing oblique vapor-deposition of $SiO_2$; a horizontal alignment method utilizing a horizontal alignment film which is not subjected to a rubbing treatment; and a method using an untreated substrate (a substrate having a transparent electrode disposed thereon).

EXAMPLES

Hereinafter, the present invention will be described by way of illustrative examples. However, the present invention is not limited thereto.

Example 1

Figure 2A:
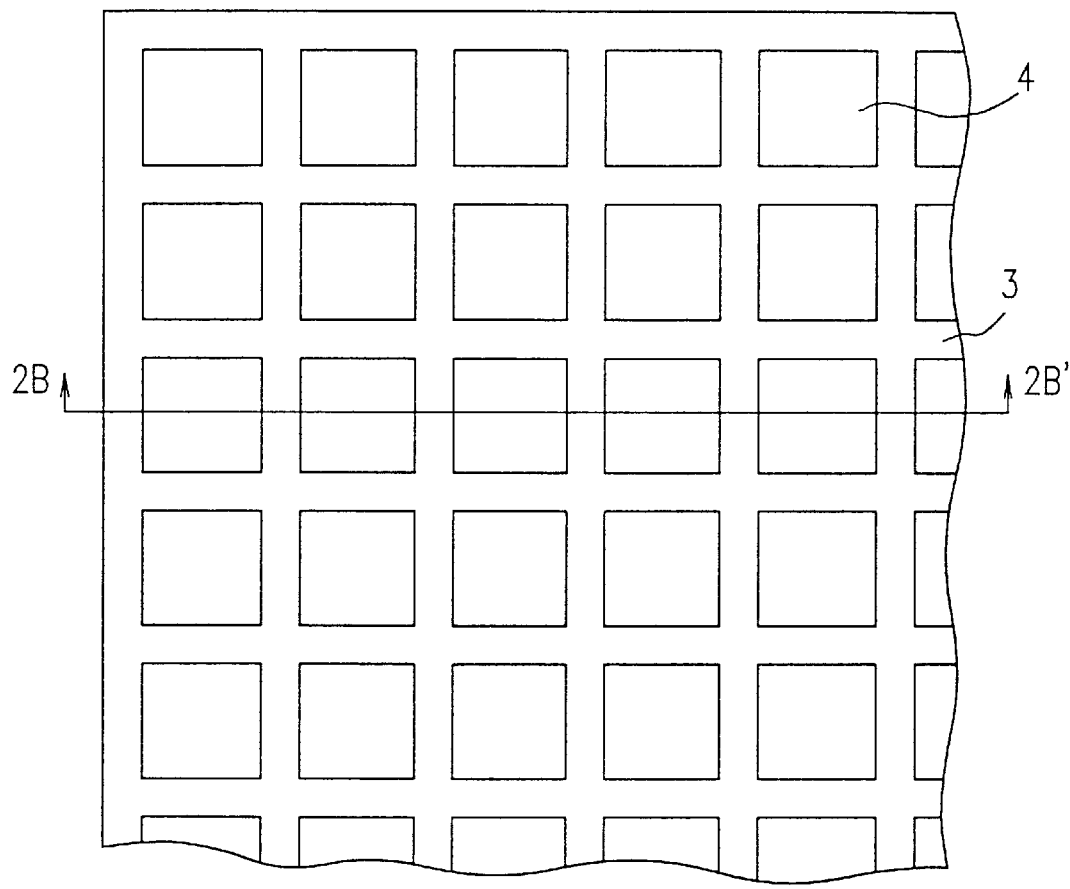
FIG. 2A is a plan view showing a substrate with a black matrix used in Example 1.
Figure 2B:
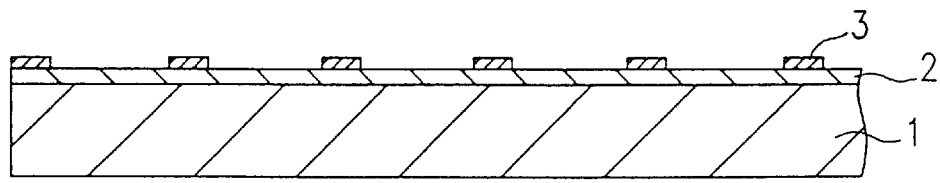
FIG. 2B is a cross-sectional view of the substrate taken along a line 2B–2B' in FIG. 2A.

A transparent electrode having a thickness of 100 nm, made of ITO (a mixture containing indium oxide and tin oxide), is formed on a glass substrate (thickness: 1.1 mm). Then, a sealing agent (Structbond XN-21S) is patterned on the substrate by a printing method. On another substrate 1 as shown in FIG. 2B (thickness: 1.1 mm; including an ITO film 2 having a thickness of 100 nm), a black matrix 3 made of a molybdenum film is patterned so as to have an opening 4 of 100 μm square (corresponding to a pixel region) as shown in FIGS. 2A and 2B. FIG. 2B is a cross-sectional view taken along a line 2B–2B' in FIG. 2A. Plastic beads (micropearl: manufactured by Sekisui Fine Chemical Co., Ltd.), each having a particle diameter of 4.5 μm, are dispersed on the substrate 1. The thus obtained substrate 1 and the previously manufactured other substrate are attached to each other, thereby manufacturing a cell.

Figure 3:
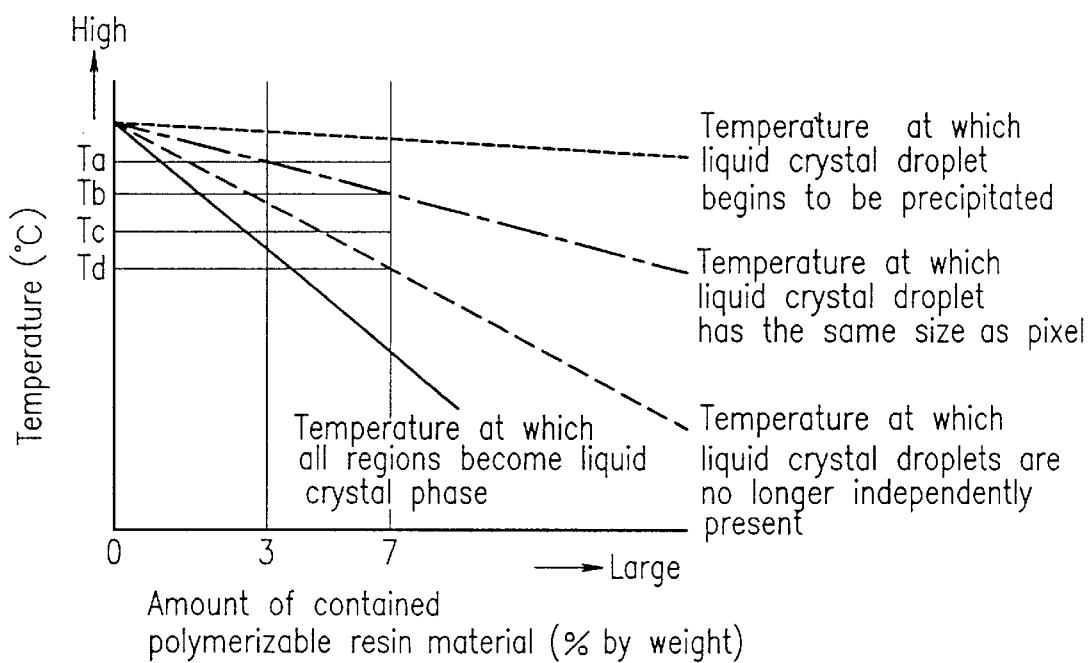
FIG. 3 is a phase diagram showing a liquid crystal cell manufactured in Example 1.

A polymerizable resin material is obtained by mixing 1.5 g of β-(perfluorooctyl)ethyl acrylate, 2.6 g of lauryl acrylate, 1.0 g of R684 (manufactured by Nippon Kayaku K. K.), and 1.9 g of p-phenylstyrene. The polymerizable resin material and ZLI-4792 (manufactured by Merck & Co., Inc.: containing 0.3 wt % of a chiral agent S-811) serving as a liquid crystal material are mixed so as to obtain a total amount of 1.0 g. Then, 0.005 g of a polymerization initiator Irgacure 651 is added thereto and is thoroughly mixed so as to obtain a precursor mixture. The thus obtained precursor mixture is injected into the cell, thereby obtaining a liquid crystal cell. The phase diagram of FIG. 3 shows the status of the precursor mixture in the liquid crystal cell as observed at various temperatures. The rate of decline in temperature of the liquid crystal cell is 0.1° C./min.

Next, the precursor mixtures respectively containing an arbitrary polymerizable resin material at 3% by weight and 7% by weight and a liquid crystal material, are cured by radiating UV-light onto the liquid crystal cells for 10 minutes at an illuminance of 10 mW/cm² under a high-pressure mercury lamp at temperatures Ta° C., Tb° C., Tc° C. and Td° C. as shown in FIG. 3. The relationship between a liquid crystal region 5 and a polymer region (miscible region) 6 at respective temperatures and respective amounts of a polymerizable resin material are shown in FIGS. 4A to 4H. FIGS. 4A to 4D show the relationship between a liquid crystal region 5 and a polymer region 6 at temperatures Ta° C., Tb° C., Tc° C. and Td° C. in the case where a polymerizable resin material is present at 3%. FIGS. 4E to 4H show the relationship between the liquid crystal region 5 and the polymer region 6 at temperatures Ta° C., Tb° C., Tc° C. and Td° C. in the case where a polymerizable resin material is present at 7%. As can be seen from FIGS. 4A to 4H, if exposure to light is performed at a temperature higher than that allowing the liquid crystal droplet to have the same size as the pixel, the liquid crystal region 5 which is smaller than preferable for a pixel is formed (see FIG. 4E). As a result, a transmittance of the obtained liquid crystal display device and a contrast of display are lowered. A transmittance and a display contrast of the liquid crystal display device, which are satisfactory for practical use, can be obtained in the case where the liquid crystal droplet is 80% or more of the pixel in size.

Next, the results of measurements of $T_{NI}$ of a liquid crystal material in the liquid crystal region of the liquid crystal display device obtained by curing the polymerizable resin material at the above respective temperatures are shown in Table 1. A $T_{NI}$ temperature is close to that of liquid crystal itself (91° C.) in the case where the curing is performed at a temperature equal to or lower than the temperature allowing the liquid crystal droplet to have the same size as the pixel. A liquid crystal cell having a high $T_{NI}$ temperature exhibits good stability in a reliability evaluation test at 70° C. for 100 hours.

TABLE 1

| Amount of contained resin material | Light exposure temperature | | | |
|---|---|---|---|---|
| | Ta | Tb | Tc | Td |
| a% | 85° C. | 81° C. | 73° C. | 72° C. |
| b% | 78° C. | 76° C. | 73° C. | 68° C. |

Example 2

The precursor mixtures respectively containing a polymerizable resin material at 5% by weight, 10% by weight, 15% by weight, and 20% by weight are prepared by using the same liquid crystal material, polymerizable resin material, and polymerization initiator as those used in Example 1. Then, the precursor mixtures are respectively injected into the same cells as those of Example 1, thereby obtaining liquid crystal cells. The liquid crystal cells containing respectively different amounts of a polymerizable resin material are heated at 95° C. for 10 hours. Then, even when the liquid crystal cells are cooled by lowering the temperature at a rate of 0.5° C./min to a temperature at which the size of the liquid crystal droplet becomes 50% of the pixel size, based on the phase diagram obtained in Example 1. For these liquid crystal cells, a ratio of the size of the liquid crystal droplet to that of the pixel is measured in 100 pixels so as to obtain standard deviations thereof. The obtained standard deviations of the respective liquid crystal cells are 0.056, 0.071, 0.062 and 0.046. Thus, the size of the liquid crystal droplets is almost uniform. Even when these liquid crystal cells are cooled at a rate of 0.5° C./min, the liquid crystal droplets still have a uniform size. The liquid crystal cells are irradiated with UV-light as in Example 1 at a temperature at which the size of the liquid crystal droplet becomes 80% or more of the pixel to cure the polymerizable resin material. The liquid crystal display device having excellent transmittance and response time during no application of a voltage can be manufactured.

Comparative Example 1

Figure 5:
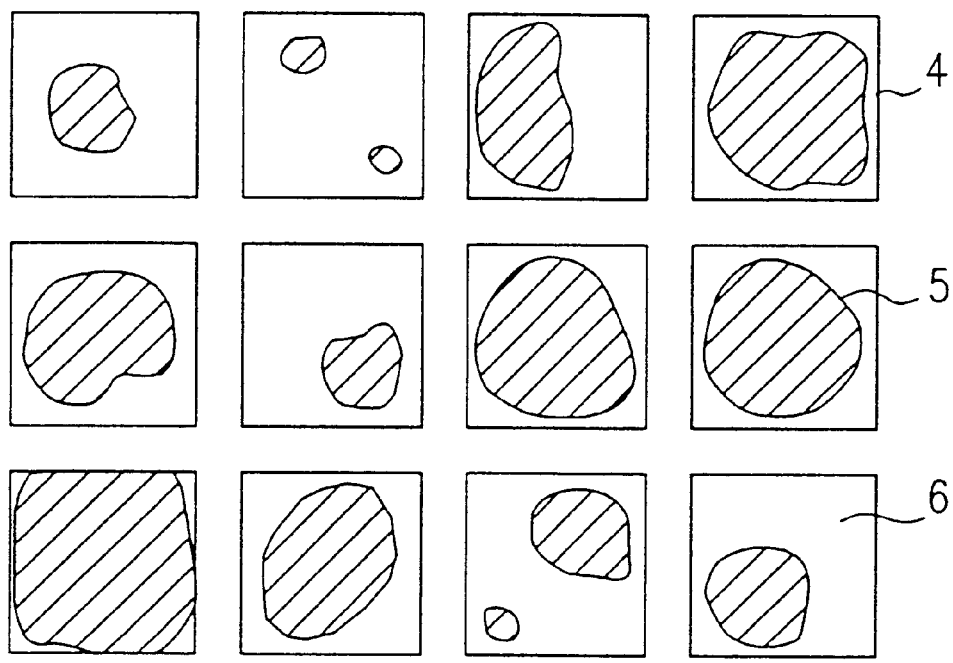
FIG. 5 schematically shows a status of pixels of Comparative Example 1 where a polymerizable resin material is present in a precursor mixture at 5% by weight.

The precursor mixtures respectively containing a polymerizable resin material at 5% by weight, 10% by weight, 15% by weight, and 20% by weight are prepared by using the same liquid crystal material, polymerizable resin material, and polymerization initiator as those used in Example 1. Then, the precursor mixtures are respectively injected into the same cells as those of Example 1, thereby obtaining liquid crystal cells. The liquid crystal cells containing respectively different amounts of a polymerizable resin material are heated at various temperatures ranging from room temperature to a temperature at which the liquid crystal droplet becomes smaller than the pixel in size. For these liquid crystal cells, a ratio of the size of the liquid crystal droplet 5 in the miscible phase 6 to that of the pixel 4 is measured in 100 pixels so as to obtain standard deviations thereof. The obtained standard deviations of the respective liquid crystal cells are 0.138, 0.187, 0.168 and 0.203. Thus, the size of the liquid crystal droplets 5 is not uniform. Even when these liquid crystal droplets 5 are cooled by lowering the temperature at a rate of 0.5° C./min, the size of the liquid crystal droplets is still not uniform as shown in FIG. 5. Moreover, in some pixels, adjacent liquid crystal droplets 5 are fused together. The liquid crystal display devices obtained by curing the polymerizable resin material through light irradiation as in Example 1 have poor optical characteristics.

Example 3

A polymerizable resin material is obtained by mixing 0.25 g of bisphenol A diglycidyl ether, 0.2 g of isobornyl acrylate, 0.1 g of β-(perfluorooctyl)ethyl acrylate, and 0.05 g of t-butylperoxide. ZLI-4792 (manufactured by Merck & Co., Inc.: containing 0.3 wt % of a chiral agent S-811) is prepared as a liquid crystal material. A precursor mixture obtained by mixing the polymerizable resin material, 0.54 g of the liquid crystal material and 0.03 g of a polymerization initiator Irgacure 907 is injected into the same cell as that used in Example 1, thereby obtaining a liquid crystal cell. After the liquid crystal cell is heated at 95° C. for 10 hours, a liquid crystal droplet is precipitated by decreasing the temperature. Then, the liquid crystal droplet is grown by cooling at various cooling rates, as shown in Table 2, until the liquid crystal droplet has the same size as the pixel. In the case where a cooling rate is high, a plurality of droplets are precipitated, grown and fused within a pixel. The occurrence of the disclination line is observed when the liquid crystal droplets are fused. A ratio of the pixels in which a disclination line is generated is examined for 100 pixels, a rate of occurrence of a disclination line of 5% or less is obtained with a cooling rate of 1° C./min or less. As the cooling rate decreases, a rate of occurrence of a disclination line is reduced. With a cooling rate of 0.5° C./min or lower, the occurrence of a disclination line is hardly observed. However, in view of a throughput, a cooling rate lower than 0.1° C./hr is not suitable for practical use.

TABLE 2

| Cooling rate (° C./min) | 10 | 6 | 5 | 4 | 3 | 2 | 1 | 0.5 |
|---|---|---|---|---|---|---|---|---|
| Rate of occurrence of disclination line (%) | 43 | 28 | 20 | 17 | 14 | 9 | 5 | 1 |

Example 4

Figure 6:
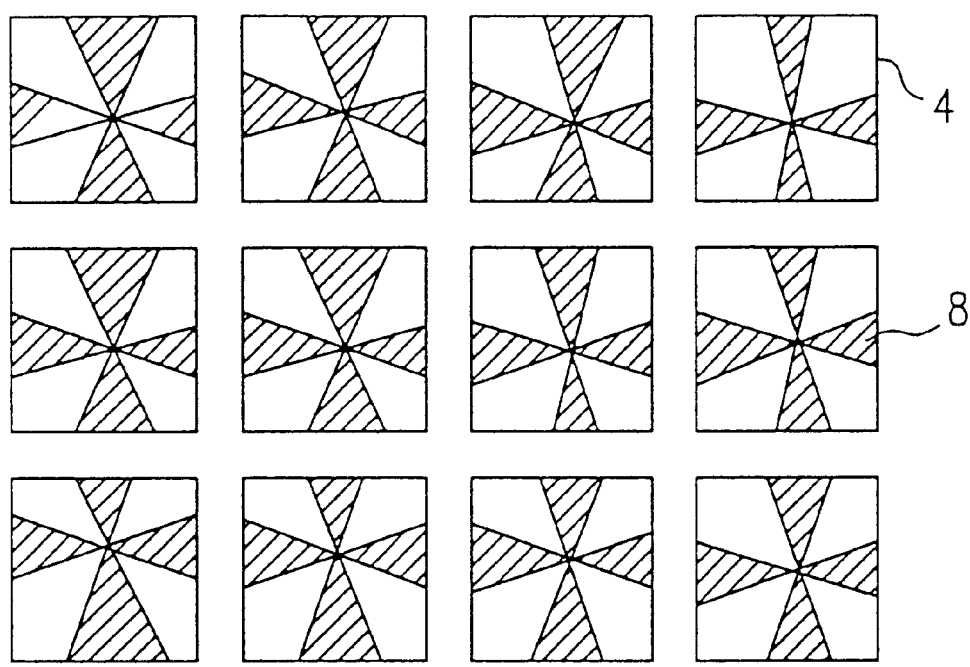
FIG. 6 schematically shows a status of pixels in the liquid crystal cell manufactured in Example 4, including axisymmetrically orientated liquid crystal molecules.

The same liquid crystal cells as those used in Example 3 are heated at 95° C. for 10 hours. Then, the liquid crystal cells are cooled at a rate of 0.5° C./min. At the time when the size of a liquid crystal droplet becomes 50% of a pixel, a rectangular wave of 60 Hz is applied across the substrates so as to axisymmetrically orientate the liquid crystal molecules. The applied voltage is boosted and dropped within the range of 0 to 5 V for several times so that a disclination line occurring within a liquid crystal droplet is present along the outer periphery of the liquid crystal droplet. Next, the application of a voltage is stopped, and the liquid crystal display devices are cooled by lowering the temperature at a rate of 0.5° C./min until the size of a liquid crystal droplet becomes 50% of a pixel. When the status of the liquid crystal droplet is observed at this temperature through a polarizing microscope, an extinction pattern 8 is observed in each of the pixels 4 as shown in FIG. 6. Therefore, it is observed that liquid crystal molecules are axisymmetrically orientated in each of the pixels 4. Next, UV-light is radiated onto the substrate under the same conditions as in Example 1 so as to cure the polymerizable resin material. Then, a polarizing plate is attached to the outer surface of each of the substrates under crossed Nicols, thereby fabricating a liquid crystal display device. The resultant display device has such a wide viewing angle that a contrast inversion does not occur within the range of ±50 degrees of a viewing angle.

Example 5

Figure 7:
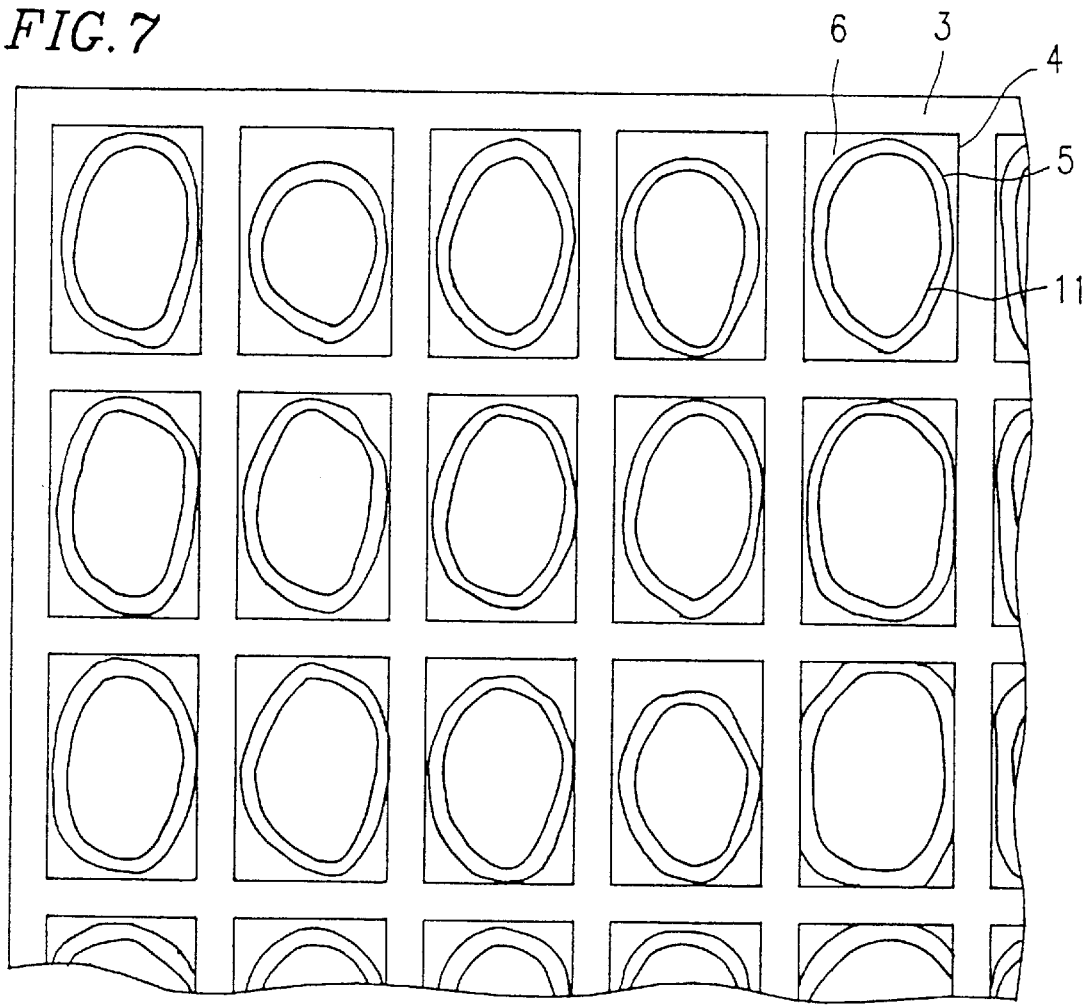
FIG. 7 is a plan view schematically showing a disclination line of a liquid crystal droplet within a liquid crystal cell fabricated in Example 5.

A transparent electrode having a thickness of 100 nm made of ITO is formed on a glass substrate thickness: 1.1 mm). Then, a sealing agent (Structbond XN-21S) is patterned by a printing method on the substrate. On another substrate (thickness: 1.1 mm, including an ITO film having a thickness of 100 nm) as shown in FIG. 7, a black matrix 3 made of a molybdenum film is patterned so as to have an opening of 50 $\mu$m×150 $\mu$m. Plastic beads (micropearl: manufactured by Sekisui Fine Chemical Co., Ltd.), each having a particle diameter of 4.5 $\mu$m, are dispersed on the substrate with the black matrix 3. Then, the substrate with the black matrix 3 and the previously manufactured other substrate are attached to each other, thereby manufacturing a cell. Then, the same precursor mixture as that used in Example 3 is injected into the cell, thereby obtaining a liquid crystal cell.

The liquid crystal cell is heated at 95° C. for 10 hours. Then, the liquid crystal cell is cooled by lowering the temperature at a rate of 0.5° C./min. At the time when the size of a liquid crystal droplet 5 precipitated in the miscible phase 6 becomes 50% of the pixel 4 in size, a rectangular wave of 60 Hz is applied across the substrates so as to axisymmetrically orientate the liquid crystal molecules. The applied voltage is boosted and dropped within the range of 0 to 5 V for several times to axisymmetrically orientate the liquid crystal molecules so that a disclination line 11 occurring within the liquid crystal droplet 5 has an elliptical shape along the outer periphery of the liquid crystal droplet 5. Next, the application of a voltage is stopped. The liquid crystal display device is cooled by lowering a temperature at a rate of 0.5° C./min until the size of the liquid crystal droplet 5 becomes the same as that of the pixel 4. After the polymerizable resin material is cured by UV-irradiation under the same conditions as those in Example 1 at this temperature, a polarizing plate is attached to the outer surface of each of the substrates under crossed Nicols, thereby fabricating a liquid crystal display device. The resultant display device has such a wide viewing angle that a contrast inversion does not occur within the range of ±50 degrees of a viewing angle.

Example 6

The same liquid crystal cells as those used in Example 3 are heated at 95° C. for 10 hours. Then, the liquid crystal cells cooled by lowering the temperature at a rate of 0.5° C./min. At the time when the size of a liquid crystal droplet becomes 50% of a pixel, a rectangular wave of 60 Hz is applied across the substrates of the liquid crystal cell at a voltage boost rate of 2 V/min, and voltage drop rates of 0.1 V/min, 0.5 V/min, 1.0 V/min, 1.5 V/min, 2.0 V/min and 5.0 V/min, respectively. With a voltage drop rate of 2.0 V/min or lower, it is possible to control the occurrence of a disclination line so that the disclination line is present along the outer periphery of the liquid crystal droplet and to axisymmetrically orientate the liquid crystal molecules. With a voltage drop rate of 5.0 V/min, however, it is impossible to regulate the position of the occurrence a disclination line and to axisymmetrically orientate the liquid crystal molecules. As a voltage drop rate is lowered, the number of liquid crystal droplets including liquid crystal molecules axisymmetrically orientated by one application of a voltage is increased. Although a voltage drop rate of 1.0 V/min or lower is preferred, 0.1 V/hr or lower is not suitable for use in view of throughput.

Example 7

The same liquid crystal cells as those used in Example 3 are heated at 95° C. for 10 hours. Then, the liquid crystal cells are cooled at a rate of 0.5° C./min. At various temperatures, a rectangular wave of 60 Hz is applied across the substrates so as to axisymmetrically orientate the liquid crystal molecules. The applied voltage is boosted and dropped within the range of 0 to 5 V for several times so that a disclination line occurring within a liquid crystal droplet is present along the outer periphery of the liquid crystal droplet. In the case where the orientation of liquid crystal molecules is regulated at a temperature at which a liquid crystal droplet is smaller than preferable for the size of a pixel, a disclination line occurs due to fusion of the liquid crystal droplets during the process of stopping the application of a voltage and then cooling the liquid crystal display cell by lowering the temperature at a rate of 0.5° C./min to the temperature allowing the liquid crystal droplet to have the same size as the pixel. If the orientation of liquid crystal molecules is regulated at the time when the size of a liquid crystal droplet is 3% or less and 99% or more of the pixel, it is difficult to observe a disclination line. If the orientation of liquid crystal molecules is regulated at the time when the size of a liquid crystal droplet is about 10% or more and less than 99%, the disclination line is more clearly observed. In the case where the size of the liquid crystal droplet exceeds 30% of the pixel upon regulation of the orientation of liquid crystal molecules, the axisymmetrical orientation of liquid crystal molecules is hardly disturbed even when the liquid crystal droplet fuses to the adjacent small liquid crystal droplet. As the liquid crystal droplet gradually enlarges to be as large as the pixel, it becomes difficult to regulate a disclination line to be present along the outer periphery of the liquid crystal droplet. In the case where the size of a liquid crystal droplet is up to 75% of the pixel, a good regularity of a disclination line is obtained. In the case where the size of a liquid crystal droplet exceeds 90%, the position of a disclination line can be hardly regulated.

Example 8

Figure 8A:
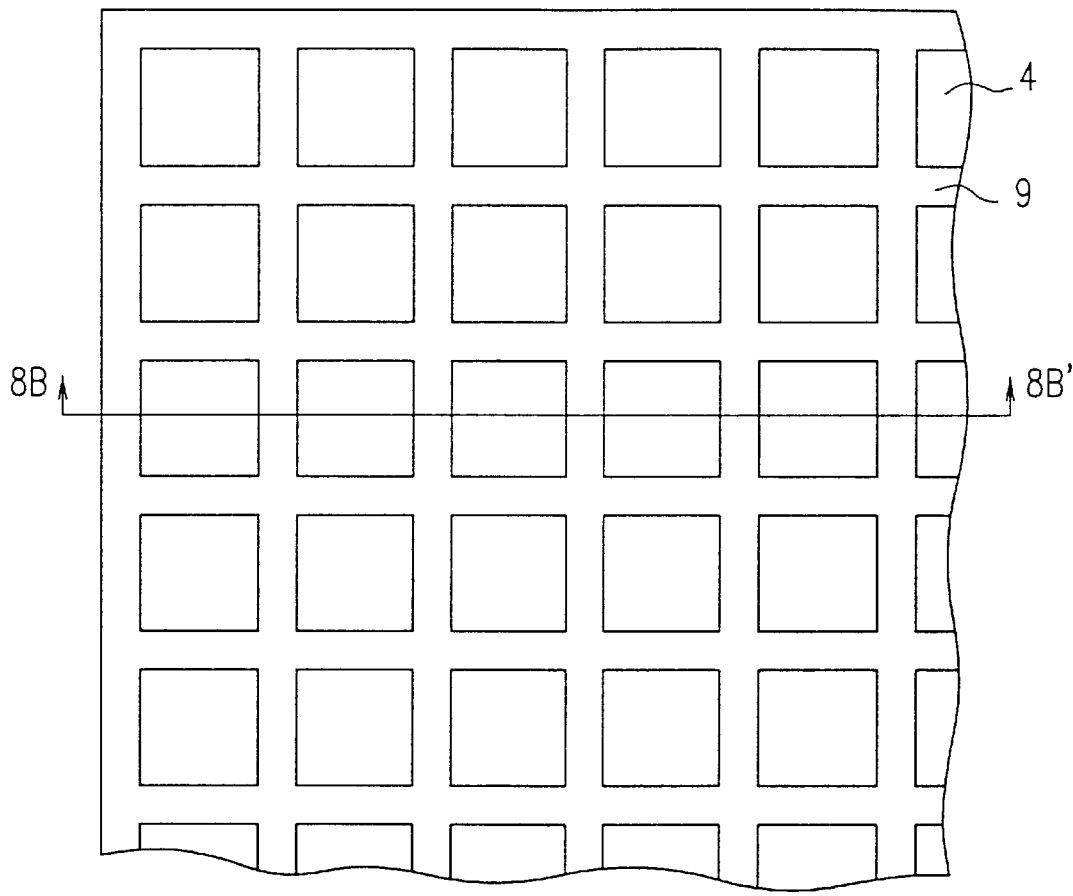
FIG. 8A is a plan view showing a substrate with protruding structures used in Examples 8 and 10.
Figure 8B:
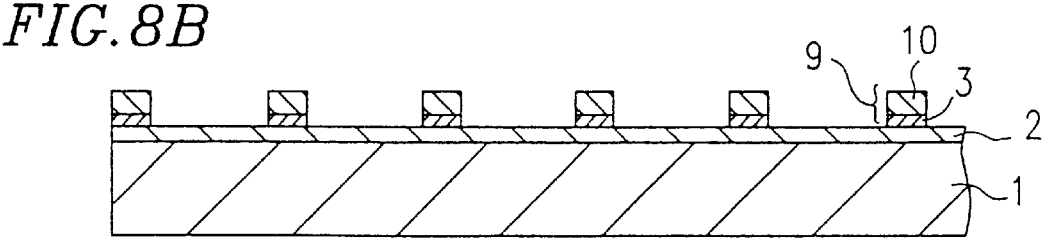
FIG. 8B is a cross-sectional view of the substrate, taken along a line 8B–8B' in FIG. 8A.

A sealing agent (Structbond XN-21S) is patterned by a printing method on a glass substrate (thickness: 1.1 mm) on which a transparent electrode made of ITO having a thickness of 100 nm is formed. On another substrate 1 on which a transparent electrode 2 made of ITO is similarly formed, a black matrix 3 made of a molybdenum film is patterned so as to have an opening 4 of 100 μm square (corresponding to a pixel region) as shown in FIGS. 8A and 8B. Thereafter, a negative type photoresist 10 (OMR83; manufactured by Tokyo Ohka Kogyo Co., Ltd.) is applied onto the black matrix 3. Then, the negative type photoresist 10 is exposed to light, developed, rinsed and baked to form protruding structures 9, each having a thickness of 2.5 μm as shown in FIGS. 8A and 8B. FIG. 8B is a cross-sectional view taken along a line 8B–8B'. Plastic beads (micropearl: manufactured by Sekisui Fine Chemical Co., Ltd.), each having a particle diameter of 4.5 μm, are dispersed on the substrate 1 including the thus formed protruding structures 9. Then, the substrate 1 including the protruding structures 9 and the previously manufactured other substrate are attached to each other, thereby manufacturing a cell.

A polymerizable resin material is obtained by mixing 1.5 g of β-(perfluorooctyl)ethyl acrylate, 2.6 g of stearyl acrylate, 1.0 g of trimethylol propane triacrylate, and 1.9 g of 4-fluorostyrene. ZLI-4792 (manufactured by Merck & Co., Inc.: containing 0.3 wt % of a chiral agent S-811) is prepared as a liquid crystal material. A precursor mixture obtained by thoroughly mixing 0.1 g of a polymerizable resin material, 0.9 g of the liquid crystal material, and 0.005 g of a polymerization initiator Irgacure 651 is injected into the cell, thereby obtaining a liquid crystal cell.

Figure 9:
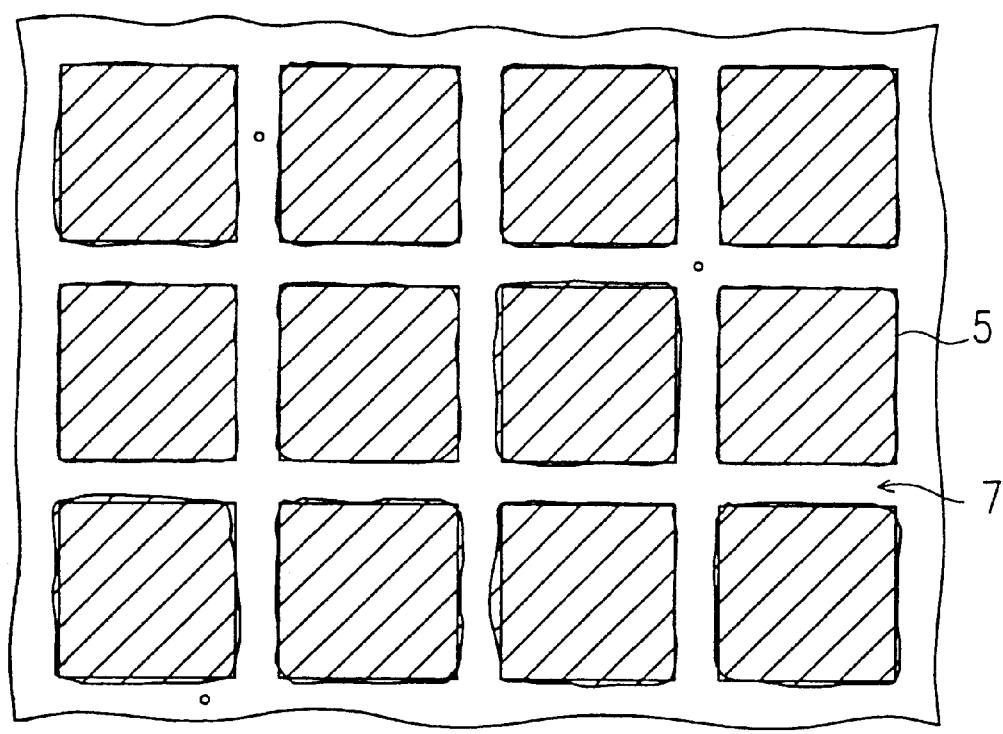
FIG. 9 is a plan view of a liquid crystal display device manufactured in Example 8 observed through a polarizing microscope in a reflection mode.

After heating the liquid crystal cell at 100° C. for 5 hours, the liquid crystal cell is cooled by lowering the temperature at a rate of 0.3° C./min. The growth of liquid crystal droplets proceeds around approximately the middle of the pixel in all pixels. The resultant liquid crystal droplets are substantially uniform over the entire cell area. When the size of the liquid crystal droplet reaches about 55% of the pixel, a rectangular wave of 60 Hz is applied across the substrates so as to axisymmetrically orientate the liquid crystal molecules. The applied voltage is boosted and dropped within the range of 0 to 5 V for several times so that a disclination line occurring within a liquid crystal droplet is present along the outer periphery of the liquid crystal droplet. Next, the application of a voltage is stopped, and the liquid crystal cell is cooled by lowering the temperature at a rate of 0.5° C./min until the liquid crystal droplet has the same size as the pixel. At the temperature at which the liquid crystal droplet has the same size as that of the pixel, UV-irradiation is performed for 15 minutes at an illuminance of 11 mW/cm$^2$ under a high-pressure mercury lamp so as to cure the polymerizable resin material. As a result, a liquid crystal display device is obtained. When the resultant liquid crystal display device is observed through a polarizing microscope in a reflection mode, a liquid crystal region 5 is hardly observed except for the pixel region (i.e., in the region where a polymer region 7 is formed) as shown in FIG. 9. The center of a Schlieren pattern (extinction pattern) is positioned almost in the middle of the pixel.

Example 9

A sealing agent (Structbond XN-21S) is patterned by a printing method on a glass substrate (thickness: 1.1 mm) on which a transparent electrode made of ITO having a thickness of 100 nm is formed. On another substrate on which a transparent electrode made of ITO is similarly formed, a black matrix made of a molybdenum film is patterned so as to have an opening of 100 μm square (corresponding to a pixel region). Thereafter, a negative type photoresist V-259PA (manufactured by Nippon Steel Chemical Co., Ltd.) is applied onto the black matrix. Then, the negative type photoresist is exposed to light, developed, rinsed and baked to form protruding structures each having a thickness of 1.8 μm. Plastic beads (micropearl: manufactured by Sekisui Fine Chemical Co., Ltd.), each having a particle diameter of 4.7 μm, are dispersed on the substrate including the thus formed protruding structures. Then, the substrate including the protruding structures and the previously manufactured other substrate are attached to each other, thereby manufacturing a cell.

As a polymerizable resin material, a mixture of 0.1 g of trimethylol propane triacrylate, 0.26 g of lauryl acrylate, 0.15 g of 2,2,3,4,4,4-hexafluorobutyl acrylate, and 0.19 g of 4-fluorostyrene is utilized. Then, 0.1 g of the polymerizable resin material, 0.9 g of a liquid crystal material, ZLI-4792 (manufactured by Merck & Co., Inc.; containing a chiral agent S-811 at 0.33 wt %) and 0.006 g of a polymerization initiator Irgacure 184 are mixed to obtain a uniform precursor mixture. Then, the precursor mixture is injected into the cells, thereby obtaining liquid crystal cells. After heating these liquid crystal cells at 90° C. for 15 hours, the liquid crystal cells are cooled at a rate of 0.8° C./min. At the time when the size of the liquid crystal droplet becomes about 45% of the pixel, a rectangular wave of 60 Hz is applied across the substrates of the liquid crystal cell so as to axisymmetrically orientate the liquid crystal molecules. The applied voltage is boosted and dropped within the range of 0 to 5 V for several times so that a disclination line occurring within a liquid crystal droplet is present along the outer periphery of the liquid crystal droplet. Next, the application of a voltage is stopped, and the liquid crystal cell is cooled by lowering the temperature at a rate of 0.5° C./min until the liquid crystal droplet has the same size as the pixel. At the temperature at which the liquid crystal droplet has the same size as that of the pixel, UV-irradiation is performed for 20 minutes at an illuminance of 13 mW/cm$^2$ under a high-pressure mercury lamp so as to cure the polymerizable resin material. Simultaneously with the UV-irradiation, a voltage of 2 V is applied across the substrates of the liquid crystal cell for 1 minute, 2 minutes, 5 minutes, 10 minutes and 20 minutes. The occurrence of a disclination line when a voltage of 5 V is applied across the liquid crystal cell after the polymerizable resin material is cured is shown in FIGS. 10A to 10F. In the case where a voltage is applied for a long time, the occurrence of a disclination line within a pixel is desirably suppressed (FIG. 10F). However, as the application time becomes longer, liquid crystal molecules are fixed at a large tilt angle as shown in Table 3. Thus, a transmittance of a liquid crystal display device and a contrast of display during no application of a voltage are disadvantageously lowered.

TABLE 3

| Application time of voltage (minutes) | 1 | 2 | 5 | 10 | 20 |
|---|---|---|---|---|---|
| Occurrence of disclination line | Several are found | Occurrence is remarkably reduced | Hardly observed | Hardly observed | None |
| Tilt angle (degrees) | 0 | 2 | 3 | 4 | 4 |
| Contrast (at 0 to 5 V) | 82 | 150 | 158 | 104 | 88 |

Example 10

A sealing agent (Structbond XN-21S) is patterned by a printing method on a glass substrate (thickness: 1.1 mm) on which a transparent electrode made of ITO having a thickness of 100 nm is formed. On another substrate 1 on which a transparent electrode 2 made of ITO is similarly formed, a black matrix 3 made of a molybdenum film is patterned so as to have an opening 4 of 100 μm square (corresponding to a pixel region) as shown in FIG. 8A. Thereafter, a negative type photoresist OMR83 10 (manufactured by Tokyo Ohka Kogyo Co., Ltd.) is applied onto the black matrix. Then, the negative type photoresist 10 is exposed to light, developed, rinsed and baked to form protruding structures 9 each having a thickness of 2.0 μm. Plastic beads (micropearl: manufactured by Sekisui Fine Chemical Co., Ltd.), each having a particle diameter of 4.5 μm, are dispersed on the substrate 1 having the thus formed protruding structures 9. Then, the substrate 1 including the protruding structures 9 and the previously manufactured other substrate are attached to each other, thereby manufacturing a cell.

A polymerizable resin material is obtained by mixing 1.5 g of 2-(perfluorooctyl)ethyl acrylate, 2.6 g of lauryl acrylate, 1.0 g of trimethylol propane triacrylate, and 1.9 g of 4-fluorostyrene. A precursor mixture obtained by mixing 0.1 g of the polymerizable resin material, 0.9 g of a liquid crystal material ZLI-4792 (manufactured by Merck & Co., Inc.: containing 0.3 wt % of a chiral agent S-811), and 0.005 g of a polymerization initiator Irgacure 907 is injected into a cell, thereby obtaining a liquid crystal cell.

After the resultant liquid crystal cell is heated at 95° C. for 5 hours, the liquid crystal cell is cooled by lowering the temperature at a rate of 0.5° C./min. At the temperature at which the liquid crystal droplet becomes 50% of a pixel in size, a rectangular wave is applied across the substrates so that a disclination line is present along the outer periphery of the liquid crystal droplet. The application of the rectangular wave is performed by 10 cycles of boost and drop of the voltage within the range of 0 to 5 V at 0.3 V/min. As a result, liquid crystal molecules are axisymmetrically orientated in about 95% of the total liquid crystal droplets. Then, the liquid crystal cell is cooled at a rate of 0.5° C./min. When the liquid crystal droplet has the same size as the pixel, UV-irradiation is performed for 15 minutes at an illuminance of 11 mW/cm$^2$ under a high-pressure mercury lamp so as to cure the polymerizable resin material. Then, a polarizing plate is attached to the outer surface of each of the substrates under crossed Nicols, thereby fabricating a liquid crystal display device. The resultant display device has such a wide viewing angle that a contrast inversion does not occur within the range of ±50 degrees of a viewing angle. Furthermore, the resultant liquid crystal display device has a contrast of 148 at a voltage in the range of 0 to 5 V and a response speed $(\tau_r+\tau_d)$ of 58 msec. Even when the liquid crystal display device is left in a constant temperature chamber at 70° C. for 100 hours, no significant change is observed in shape of the liquid crystal region and electro-optic characteristics of the liquid crystal display device.

Example 11

A liquid crystal cell is manufactured in the same manner as in Example 10. The obtained liquid crystal cell is heated at 95° C. for 5 hours, and is then cooled by lowering the temperature at a rate of 2.5° C./min. As a result, nonuniform liquid crystal droplets are generated. At the temperature at which the size of the liquid crystal droplet becomes between 45% to 50% of the pixel, a rectangular wave is applied across the substrates of the liquid crystal cell so as to axisymmetrically orientate the liquid crystal molecules. The applied voltage is boosted and dropped within the range of 0 to 5 V for several times at 1.7 V/min so that a disclination line occurring within a liquid crystal droplet is present along the outer periphery of the liquid crystal droplet. At this first application of the voltage, liquid crystal molecules are axisymmetrically orientated in about 30% of the liquid crystal droplets in which the liquid crystal molecules were not previously axisymmetrically orientated. However, when a cycle of boosting and dropping a voltage is repeated, a ratio of the liquid crystal droplets including axisymmetrically orientated liquid crystal molecules to the total droplets is reduced. In order to axisymmetrically orientate the liquid crystal molecules in about 60% or more of the liquid crystal droplets of the total pixels, about 300 cycles of boosting and dropping a voltage should be repeated. Subsequently, after the liquid crystal cell is heated at 95° C. for 5 hours again, the liquid crystal cell is cooled by lowering the temperature at a rate of 0.5° C./min. As a result, liquid crystal droplets having almost the same size are obtained in all pixels. At a temperature at which the size of the liquid crystal droplet becomes about 50% of the pixel, a rectangular wave is applied across the substrates of the liquid crystal cell so as to axisymmetrically orientate the liquid crystal molecules. The applied voltage is boosted and dropped within the range of 0 to 5 V for several times at 0.3 V/min so that a disclination line occurring within the liquid crystal droplet is present along the outer periphery of the liquid crystal droplet. As a result, liquid crystal molecules are axisymmetrically orientated in about 95% of the liquid crystal droplets in which the liquid crystal molecules are not previously axisymmetrically orientated. Then, the liquid crystal cell is cooled by lowering the temperature at a rate of 0.5° C./min until the liquid crystal droplet has the same size as the pixel. At the temperature at which the liquid crystal droplet has the same size as that of the pixel, UV-irradiation is performed for 15 minutes at an illuminance of 11 mW/cm$^2$ under a high-pressure mercury lamp so as to cure the polymerizable resin material. Then, a polarizing plate is attached to the outer surface of each of the substrates under crossed Nicols, thereby fabricating a liquid crystal display device. The resultant display device has such a wide viewing angle that a contrast inversion does not occur within the range of ±50 degrees of a viewing angle. Furthermore, the resultant liquid crystal display device has a contrast of 144 at a voltage in the range of 0 to 5 V and a response speed $(\tau_r+\tau_d)$ of 55 msec. Even when the liquid crystal display device is left in a constant temperature chamber at 70° C. for 100 hours, there is no significant change in shape of the liquid crystal region and electro-optic characteristics of the liquid crystal display device. The following is confirmed by this experiment. If the liquid crystal molecules in a liquid crystal droplet are not axisymmetrically orientated to a sufficient degree, the temperature of the liquid crystal cell is increased and lowered before the polymerizable resin material is cured so as to reorientate the liquid crystal molecules to a sufficient degree.

Example 12

Figure 11A:
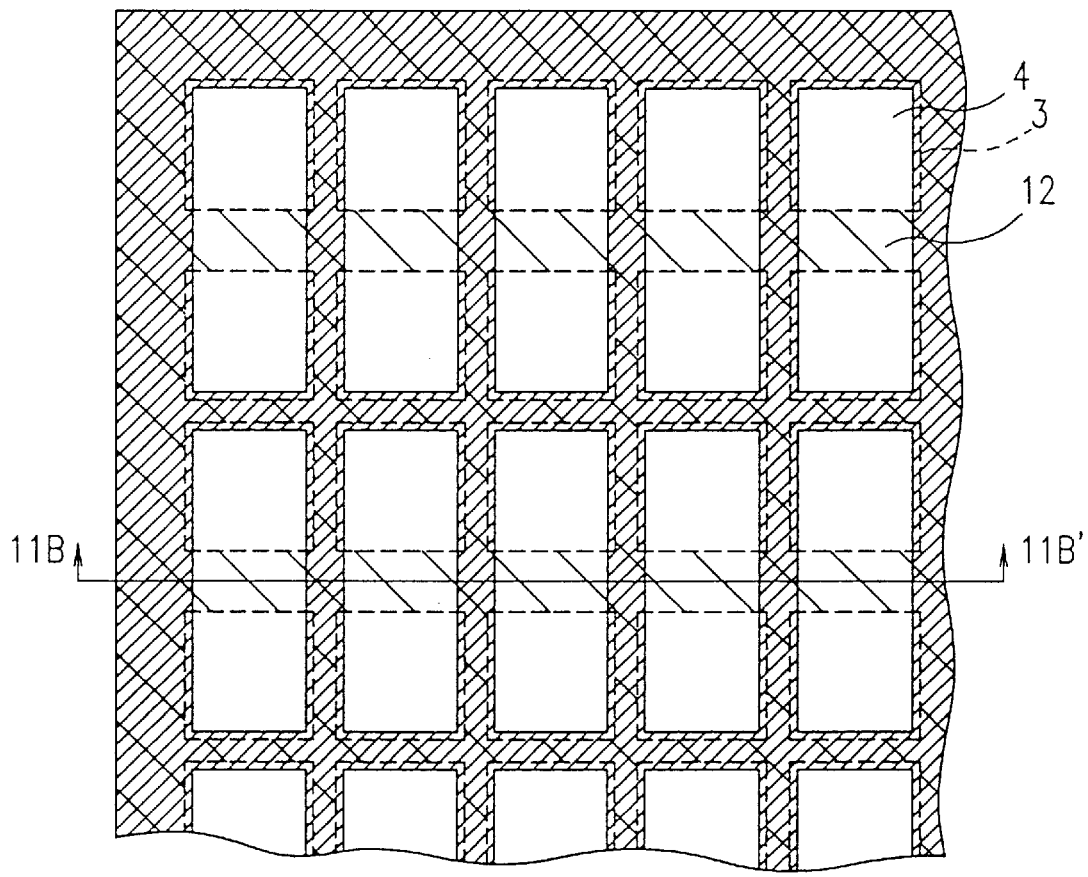
FIG. 11A is a plan view showing a substrate with a black matrix, used in Example 12.
Figure 11B:
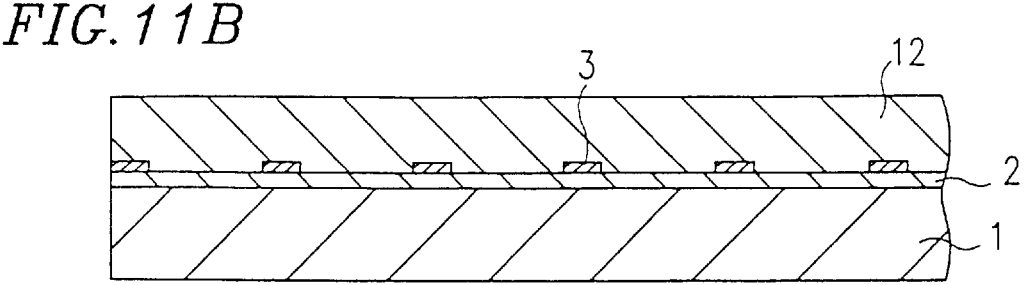
FIG. 11B is a cross-sectional view of the substrate taken along a line 11B–11B' in FIG. 11A.

A transparent electrode having a thickness of 100 nm made of ITO is formed on a glass substrate (thickness: 1.1 mm). Then, a sealing agent (Structbond XN-21S) is patterned by a printing method on the substrate. On another substrate 1 (thickness: 1.1 mm, including an ITO film having a thickness of 100 nm) as shown in FIG. 11B, a black matrix 3 made of a molybdenum film is patterned so as to have an opening 4 of 50 µm×150 µm. Then, a negative type photoresist (V-259PA; manufactured by Nippon Steel Chemical Co., Ltd.) is applied onto the black matrix 3. Then, the negative type photoresist is exposed to light, developed, rinsed and baked to form protruding structures 12, each having a thickness of 2.2 µm. The pixel surrounded by the black matrix 3 is partitioned by the protruding structures 12 constituted by the resist into two parts, thereby forming pixel regions, each having a dimension of 50 µm×55 µm. Plastic beads (micropearl: manufactured by Sekisui Fine Chemical Co., Ltd.), each having a particle diameter of 4.6 µm, are dispersed on the substrate 1 having the thus formed protruding structures 2. Then, the substrate 1 including the protruding structures and the previously manufactured other substrate are attached to each other, thereby manufacturing a cell.

The same precursor material as that used in Example 3 is injected into the resultant cell, thereby obtaining a liquid crystal cell. The obtained liquid crystal cell is heated at 95° C. for 10 hours, and is then cooled by lowering the temperature at a rate of 0.5° C./min. At the temperature at which the size of the liquid crystal droplet becomes about 50% of the pixel obtained by partition (that is, 50 µm×55 µm), a rectangular wave of 60 Hz is applied across the substrates of the liquid crystal cell so as to axisymmetrically orientate the liquid crystal molecules. The applied voltage is boosted and dropped within the range of 0 to 5 V for several times so that a disclination line occurring within the liquid crystal droplet is present in an elliptical form along the outer periphery of the liquid crystal droplet. Then, the application of a voltage is stopped, and the liquid crystal cell is cooled by lowering the temperature at a rate of 0.5° C./min until the size of the liquid crystal droplet becomes the same as the pixel (50 µm×55 µm). When the size of the liquid crystal droplet is the same as the pixel, UV-irradiation is performed under the same conditions as in Example 1 so as to cure the polymerizable resin material. Then, a polarizing plate is attached to the outer surface of each of the substrates under crossed Nicols, thereby fabricating a liquid crystal display device.

The resultant display device has such a wide viewing angle that a contrast inversion does not occur within the range of ±50 degrees of a viewing angle as in Example 5. In comparison with the liquid crystal display device fabricated in Example 5, an aperture ratio is lowered in the liquid crystal display device of Example 12, resulting in slight reduction of a transmittance. This is due to that the pixel surrounded by the black matrix is partitioned by the protruding structures 12 constituted by the resist. However, the liquid crystal display device including pixels having a uniform Schlieren pattern (extinction pattern) can be obtained.

According to the present invention, in manufacture of the liquid crystal display device having a liquid crystal region surrounded by a polymer material, definite phase-separation between a liquid crystal phase and a polymer phase can be performed in accordance with a precursor mixture containing a liquid crystal material, a polymerizable resin material and a polymerization initiator, and the kind and shape of a substrate. As a result, a liquid crystal display device having excellent viewing angle characteristics, an excellent contrast of display, and a reliability at a high temperature can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating a liquid crystal display device including a liquid crystal region surrounded by a polymer material, comprising the steps of:

attaching a pair of substrates to each other, each having at least an electrode film;

disposing a precursor mixture containing a liquid crystal material, a polymerizable resin material and a polymerization initiator, between the pair of substrates;

precipitating a liquid crystal droplet by varying a temperature of the precursor mixture;

growing the precipitated liquid crystal droplet;

curing the polymerizable resin material at a temperature at which the liquid crystal droplet is 80% or more of a size of a pixel and is independently present within a pixel region; and applying an external field across the pair of substrates at some time during the curing of the polymerizable resin material to provide a pre-tilt angle for the liquid crystal molecules of the liquid crystal droplet.

2. A method for fabricating a liquid crystal display device according to claim 1, wherein the temperature for curing the polymerizable resin material allows the liquid crystal droplet to have the same size as the pixel and to be independently present within the pixel region.

3. A method for fabricating a liquid crystal display device according to claim 1, wherein the temperature is varied by heating the precursor mixture to a temperature allowing the precursor mixture to be a uniform liquid and then cooling the precursor mixture.

4. A method for fabricating a liquid crystal display device according to claim 1, wherein the liquid crystal droplet is grown by lowering a temperature at a rate of 5° C./min or lower.

5. A method for fabricating a liquid crystal display device according to claim 1, wherein the liquid crystal droplet is grown by lowering a temperature at a rate of 2° C./min or lower.

6. A method for fabricating a liquid crystal display device according to claim 1, wherein the liquid crystal droplet is grown by lowering a temperature at a rate of 1° C./min or lower.

7. A method for fabricating a liquid crystal display device according to claim 1, wherein the polymerizable resin material is cured by irradiation with light.

8. A method for fabricating a liquid crystal display device according to claim 1, wherein a voltage is applied across the pair of substrates so as to cure the polymerizable resin material.

9. A method for fabricating a liquid crystal display device according to claim 1, wherein a protruding structure is present so as to surround the pixel region of the substrate.

10. A method for fabricating a liquid crystal display device according to claim 1, further comprising the step of applying an external field across the pair of substrates so that a disclination line is present along an outer periphery of the liquid crystal droplet, thereby axisymmetrically orientating the liquid crystal molecules.

11. A method for fabricating a liquid crystal display device according to claim 10, wherein the liquid crystal molecules are axisymmetrically orientated at a temperature at which the size of the liquid crystal droplet becomes between 30% and 75% of the size of a pixel.

12. A method for fabricating a liquid crystal display device according to claim 10, wherein the step of applying the external field includes the step of boosting and dropping a voltage applied across the pair of substrates so that a disclination line is present along an outer periphery of the liquid crystal droplet, thereby axisymmetrically orientating the liquid crystal molecules.

13. A method for fabricating a liquid crystal display device according to claim 12, wherein the applied voltage is dropped at a rate lower than 2 V/min.

14. A method for fabricating a liquid crystal display device according to claim 12, the liquid crystal molecules are axisymmetrically orientated at a temperature at which the size of the liquid crystal droplet becomes between 3% and 99% of the pixel.

15. A method for fabricating a liquid crystal display device, comprising the steps of:
attaching first and second substrates, each having an electrode film, with a predetermined gap therebetween;
placing a precursor mixture comprising a liquid crystal material and a polymerizable resin material between said first and second substrates;
precipitating a liquid crystal droplet from said precursor mixture;
growing the precipitated liquid crystal droplet;
applying a voltage across the pair of substrates to axisymmetrically orientate the liquid crystal molecules of the liquid crystal droplet so that a disclination line is present along an outer periphery of the liquid crystal droplet; and
curing the polymerizable resin material when the size of the liquid crystal droplet is 80% or more of the size of a pixel to form a polymer region which substantially surrounds the liquid crystal droplet,
wherein an external field is applied across the pair of substrates at some time during the curing of the polymerizable resin material to pre-tilt the liquid crystal molecules of the liquid crystal droplet.

16. A method for fabricating a liquid crystal display device according to claim 15, wherein the precursor mixture further comprises a polymerization initiator.

17. A method for fabricating a liquid crystal display device according to claim 15, wherein the voltage is applied across the pair of substrates when the size of the liquid crystal droplet is between 30% and 75% of the size of a pixel.

18. A method for fabricating a liquid crystal display device according to claim 15, wherein the polymerizable resin material is cured when the size of the liquid crystal droplet is about the same as the size of a pixel.

19. A method for fabricating a liquid crystal display device according to claim 1, wherein the external field is applied at the initiation of the step of curing the polymerizable resin material and is continued until a pre-tilt angle is provided for the liquid crystal molecules before the termination of the step of curing the polymerizable resin material.

20. A method for fabricating a liquid crystal display device according to claim 1, wherein the external field is a voltage.

21. A method for fabricating a liquid crystal display device according to claim 1, wherein the external field is a magnetic field.

22. A method for fabricating a liquid crystal display device according to claim 15, wherein the external field is a voltage.

23. A method for fabricating a liquid crystal display device according to claim 15, wherein the external field is a magnetic field.

* * * * *